(12) United States Patent
Zhao et al.

(10) Patent No.: US 10,896,520 B2
(45) Date of Patent: Jan. 19, 2021

(54) SYSTEM AND METHOD FOR MOMENT CAPTURING

(71) Applicant: SZ DJI TECHNOLOGY CO., LTD., Shenzhen (CN)

(72) Inventors: Cong Zhao, Shenzhen (CN); Xuyang Feng, Shenzhen (CN); Jie Qian, Shenzhen (CN); Sijin Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/382,558

(22) Filed: Apr. 12, 2019

(65) Prior Publication Data
US 2019/0244385 A1 Aug. 8, 2019

Related U.S. Application Data

(63) Continuation of application No. PCT/CN2016/102190, filed on Oct. 14, 2016.

(51) Int. Cl.
*G06T 7/70* (2017.01)
*H04N 5/232* (2006.01)
(Continued)

(52) U.S. Cl.
CPC .............. *G06T 7/70* (2017.01); *B64C 39/024* (2013.01); *G06T 7/20* (2013.01); *H04N 5/232* (2013.01); *B64C 2201/127* (2013.01); *B64C 2201/141* (2013.01); *G06T 7/292* (2017.01); *H04N 5/247* (2013.01)

(58) Field of Classification Search
CPC ....... G05D 1/0094; G06K 2009/00738; G06K 9/00335; G06K 9/00342; G06K 9/00348; G06K 9/00355; G06K 9/00711; G06K 9/00718; G06K 9/00724; G06K 9/00731; G06K 9/00744; G06K 9/00751; G06K 9/00765
See application file for complete search history.

(56) References Cited

U.S. PATENT DOCUMENTS 9,442,485 B1 * 9/2016 McDermott ......... G05D 1/0094
9,643,722 B1 * 5/2017 Myslinski .......... G06K 9/00711
(Continued)

FOREIGN PATENT DOCUMENTS

CN 102469264 A 5/2012
CN 104408725 A 3/2015
(Continued)

OTHER PUBLICATIONS

World Intellectual Property Organization (WIPO) International Search Report and Written Opinion for PCT/CN2016/102190 dated Jul. 11, 2017 7 Pages.

*Primary Examiner* — Thomas G Black
*Assistant Examiner* — Sara J Lewandroski
(74) *Attorney, Agent, or Firm* — Anova Law Group, PLLC

(57) ABSTRACT

An imagery method includes obtaining a plurality of images of an object captured using one or more imaging devices within a period of time while the object is being tracked, performing motion and/or state estimation of the object for the period of time, and selecting one or more images related to a moment from the plurality of images based on the motion and/or state estimation of the object.

18 Claims, 10 Drawing Sheets

(51) Int. Cl.
   *G06T 7/20*     (2017.01)
   *B64C 39/02*    (2006.01)
   *G06T 7/292*    (2017.01)
   *H04N 5/247*    (2006.01)

(56) References Cited

U.S. PATENT DOCUMENTS

| | | | | |
|---|---|---|---|---|
| 9,817,394 | B1* | 11/2017 | Lema | G05D 1/101 |
| 2007/0279494 | A1* | 12/2007 | Aman | H04N 5/23238 |
| | | | | 348/169 |
| 2014/0119716 | A1* | 5/2014 | Ohtomo | G05D 1/0094 |
| | | | | 396/8 |
| 2014/0336848 | A1* | 11/2014 | Saund | G06T 7/215 |
| | | | | 701/3 |
| 2015/0134143 | A1* | 5/2015 | Willenborg | G05D 1/0094 |
| | | | | 701/2 |
| 2015/0350614 | A1* | 12/2015 | Meier | G06K 9/0063 |
| | | | | 348/144 |
| 2015/0363648 | A1* | 12/2015 | Li | G06K 9/00751 |
| | | | | 386/241 |
| 2016/0054737 | A1* | 2/2016 | Soll | G11B 27/031 |
| | | | | 701/3 |
| 2016/0092727 | A1* | 3/2016 | Ren | G06T 7/194 |
| | | | | 382/103 |
| 2016/0173754 | A1* | 6/2016 | Wang | H04N 5/23203 |
| | | | | 348/144 |
| 2016/0205317 | A1* | 7/2016 | Kimura | G09B 19/0038 |
| | | | | 348/211.6 |
| 2016/0314818 | A1* | 10/2016 | Kirk | G11B 27/10 |
| 2016/0322078 | A1* | 11/2016 | Bose | A63F 13/217 |
| 2017/0118539 | A1* | 4/2017 | Lokshin | G06K 9/4628 |
| 2018/0050800 | A1* | 2/2018 | Boykin | H04N 21/435 |
| 2018/0102143 | A1* | 4/2018 | Allison | H04N 21/4788 |
| 2018/0295428 | A1* | 10/2018 | Bi | H04N 7/18 |
| 2019/0261065 | A1* | 8/2019 | Lokshin | G06K 9/00718 |

FOREIGN PATENT DOCUMENTS

| | | |
|---|---|---|
| CN | 105049678 A | 11/2015 |
| CN | 105518555 A | 4/2016 |
| CN | 105658287 A | 6/2016 |
| WO | 2015105886 A1 | 7/2015 |

* cited by examiner

SYSTEM AND METHOD FOR MOMENT CAPTURING

CROSS-REFERENCE TO RELATED APPLICATION

This application is a continuation of International Application No. PCT/CN2016/102190, filed on Oct. 14, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to image capturing and more particularly, but not exclusively, to moment capturing.

BACKGROUND

All photographers, both amateur photographers and professional photographers, are constantly searching for the right moment. A universal challenge is how to anticipate the right timing for capturing the exciting and memorable moments that are impossible or difficult to reproduce. This is the general area that embodiments of the disclosure are intended to address.

SUMMARY

Described herein are systems and methods that provide a technical solution for moment capturing in an imagery environment. The system can obtain a plurality of images of an object, wherein the plurality of images are captured using one or more imaging devices within a period of time while the object is being tracked. Furthermore, the system can perform motion and/or state estimation of the object for the period of time. Then, the system can select one or more images related to a moment from the plurality of images based on the motion and/or state estimation of the object.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses an unmanned aerial vehicle (UAV) as example for a movable platform. It will be apparent to those skilled in the art that other types of movable platform can be used without limitation.

Traditionally, only the professionals may be able to capture the exciting and memorable moments. Using the conventional technologies, it is necessary for the photographer to be equipped with a high level of skills, a lot of patience and abundant resources for capturing these precious moments. For example, in order to capture a perfect picture of a person in a simple jump motion, the jumper and the photographers may need to cooperate and repeat the process for many times until success.

In accordance with various embodiments of the present disclosure, the system can provide a technical solution for supporting convenient moment capturing in an imagery environment. The system can obtain a plurality of images of an object, wherein the plurality of images are captured using one or more imaging devices (e.g. a camera carried by a movable platform such as a UAV) within a period of time while the object is being tracked. Furthermore, the system can perform motion and/or state estimation of the object for the period of time. Then, the system can select one or more images related to a moment from the plurality of images based on the motion and/or state estimation of the object. Thus, the technical solution can avoid the traditional trial-and-error approaches and allows a single user to conveniently perform the moment capturing task without a need for additional resource and time.

Figure 1:
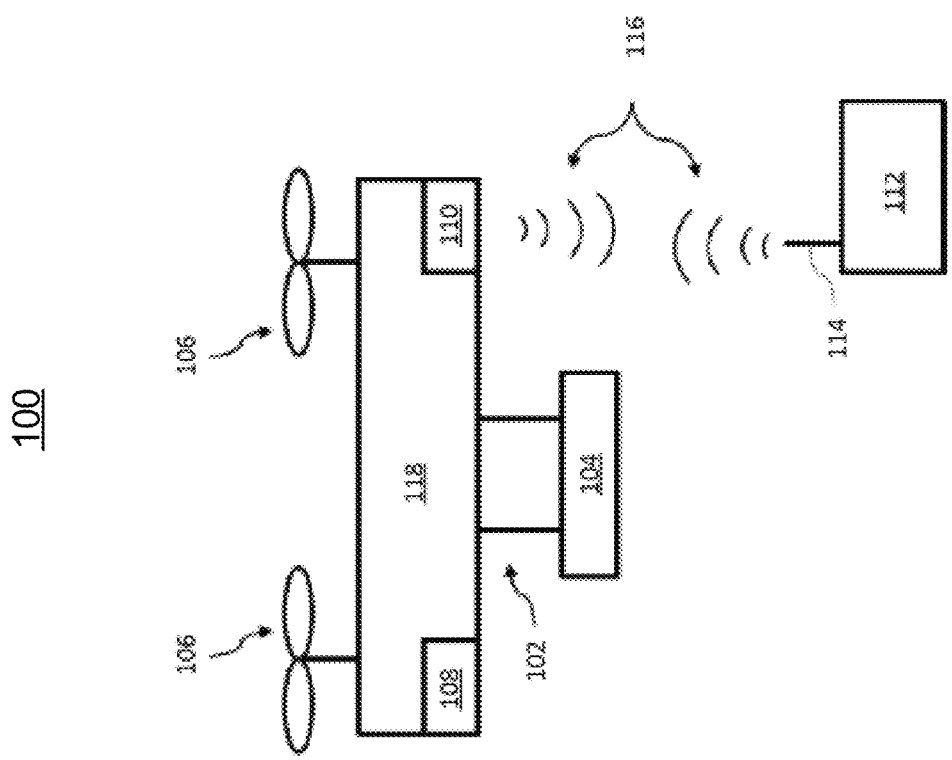
FIG. 1 illustrates a movable platform environment, in accordance with various embodiments of the present disclosure.

FIG. 1 illustrates a movable platform environment, in accordance with various embodiments of the present disclosure. As shown in FIG. 1, a movable platform 118 (also referred to as a movable object) in a movable platform environment 100 can include a carrier 102 and a payload 104. Although the movable platform 118 can be depicted as an aircraft, this depiction is not intended to be limiting, and any suitable type of movable platform can be used. One of skill in the art would appreciate that any of the embodiments described herein in the context of aircraft systems can be applied to any suitable movable platform (e.g., a UAV). In some instances, the payload 104 may be provided on the movable platform 118 without requiring the carrier 102.

In accordance with various embodiments of the present disclosure, the movable platform 118 may include one or more movement mechanisms 106 (e.g. propulsion mechanisms), a sensing system 108, and a communication system 110.

The movement mechanisms 106 can include one or more of rotors, propellers, blades, engines, motors, wheels, axles, magnets, nozzles, or any mechanism that can be used by animals, or human beings for effectuating movement. For example, the movable platform may have one or more propulsion mechanisms. The movement mechanisms 106 may all be of the same type. Alternatively, the movement mechanisms 106 can be different types of movement mechanisms. The movement mechanisms 106 can be mounted on the movable platform 118 (or vice-versa), using any suitable means such as a support element (e.g., a drive shaft). The movement mechanisms 106 can be mounted on any suitable portion of the movable platform 118, such on the top, bottom, front, back, sides, or suitable combinations thereof.

In some embodiments, the movement mechanisms 106 can enable the movable platform 118 to take off vertically from a surface or land vertically on a surface without requiring any horizontal movement of the movable platform 118 (e.g., without traveling down a runway). Optionally, the movement mechanisms 106 can be operable to permit the movable platform 118 to hover in the air at a specified position and/or orientation. One or more of the movement mechanisms 106 may be controlled independently of the other movement mechanisms. Alternatively, the movement mechanisms 106 can be configured to be controlled simultaneously. For example, the movable platform 118 can have multiple horizontally oriented rotors that can provide lift and/or thrust to the movable platform. The multiple horizontally oriented rotors can be actuated to provide vertical takeoff, vertical landing, and hovering capabilities to the movable platform 118. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable platform 118 (e.g., with respect to up to three degrees of translation and up to three degrees of rotation).

The sensing system 108 can include one or more sensors that may sense the spatial disposition, velocity, and/or acceleration of the movable platform 118 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 108 can be used to control the spatial disposition, velocity, and/or orientation of the movable platform 118 (e.g., using a suitable processing unit and/or control module). Alternatively, the sensing system 108 can be used to provide data regarding the environment surrounding the movable platform, such as weather conditions, proximity to potential obstacles, location of geographical features, location of manmade structures, and the like.

The communication system 110 enables communication with terminal 112 having a communication system 114 via wireless signals 116. The communication systems 110, 114 may include any number of transmitters, receivers, and/or transceivers suitable for wireless communication. The communication may be one-way communication, such that data can be transmitted in only one direction. For example, one-way communication may involve only the movable platform 118 transmitting data to the terminal 112, or vice-versa. The data may be transmitted from one or more transmitters of the communication system 110 to one or more receivers of the communication system 112, or vice-versa. Alternatively, the communication may be two-way communication, such that data can be transmitted in both directions between the movable platform 118 and the terminal 112. The two-way communication can involve transmitting data from one or more transmitters of the communication system 110 to one or more receivers of the communication system 114, and vice-versa.

In some embodiments, the terminal 112 can provide control data to one or more of the movable platform 118, carrier 102, and payload 104 and receive information from one or more of the movable platform 118, carrier 102, and payload 104 (e.g., position and/or motion information of the movable platform, carrier or payload; data sensed by the payload such as image data captured by a payload camera; and data generated from image data captured by the payload camera). In some instances, control data from the terminal may include instructions for relative positions, movements, actuations, or controls of the movable platform, carrier, and/or payload. For example, the control data may result in a modification of the location and/or orientation of the movable platform (e.g., via control of the movement mechanisms 106), or a movement of the payload with respect to the movable platform (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable platform, carrier and/or payload may include information from one or more sensors (e.g., of the sensing system 108 or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable platform, carrier, and/or payload. Such information from a payload may include data captured by the payload or a sensed state of the payload. The control data transmitted by the terminal 112 can be configured to control a state of one or more of the movable platform 118, carrier 102, or payload 104. Alternatively or in combination, the carrier 102 and payload 104 can also each include a communication module configured to communicate with terminal 112, such that the terminal can communicate with and control each of the movable platform 118, carrier 102, and payload 104 independently.

In some embodiments, the movable platform 118 can be configured to communicate with another remote device in addition to the terminal 112, or instead of the terminal 112. The terminal 112 may also be configured to communicate with another remote device as well as the movable platform 118. For example, the movable platform 118 and/or terminal 112 may communicate with another movable platform, or a carrier or payload of another movable platform. When desired, the remote device may be a second terminal or other computing device (e.g., computer, laptop, tablet, smartphone, or other mobile device). The remote device can be configured to transmit data to the movable platform 118, receive data from the movable platform 118, transmit data to the terminal 112, and/or receive data from the terminal 112. Optionally, the remote device can be connected to the Internet or other telecommunications network, such that data received from the movable platform 118 and/or terminal 112 can be uploaded to a website or server.

Figure 2:
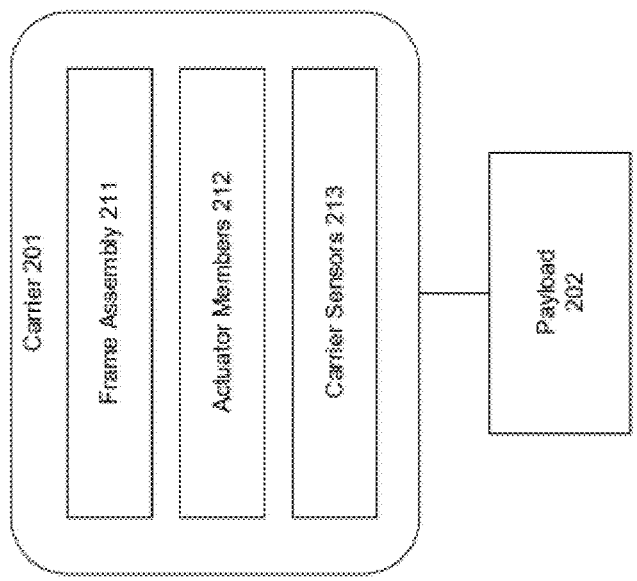
FIG. 2 illustrates an exemplary carrier in a movable platform environment, in accordance with embodiments.
Figure 2:
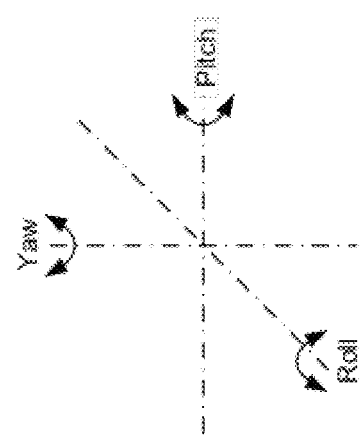

FIG. 2 illustrates an exemplary carrier in a movable platform environment, in accordance with embodiments. The carrier 200 can be used to couple a payload 202 such as an image capturing device to a movable platform such as a UAV.

The carrier 200 can be configured to permit the payload 202 to rotate about one or more axes, such as three axes: X or pitch axis, Z or roll axis, and Y or yaw axis, relative to the movable platform. For instance, the carrier 200 may be configured to permit the payload 202 to rotate only around one, two, or three of the axes. The axes may or may not be orthogonal to each other. The range of rotation around any of the axes may or may not be limited and may vary for each of the axes. The axes of rotation may or may not intersect with one another. For example, the orthogonal axes may intersect with one another. They may or may not intersect at a payload 202. Alternatively, they may not intersect.

The carrier 200 can include a frame assembly 211 comprising one or more frame members. For example, a frame member can be configured to be coupled with and support the payload 202 (e.g., image capturing device).

In some embodiments, the carrier 201 can comprise one or more carrier sensors 213 useful for determining a state of the carrier 201 or the payload 202 carried by the carrier 201. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 202. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors 213 may be coupled to any suitable portion or portions of the carrier (e.g., frame members and/or actuator members) and may or may not be movable relative to the UAV. Additionally or alternatively, at least some of the carrier sensors may be coupled directly to the payload 202 carried by the carrier 201.

The carrier sensors 213 may be coupled with some or all of the actuator members of the carrier. For example, three carrier sensors can be respectively coupled to the actuator members 212 for a three-axis carrier and configured to measure the driving of the respective actuator members 212 for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors 213 may also be coupled to some or all of the frame members of the carrier. The sensors may be able to convey information about the position and/or orientation of one or more frame members of the carrier and/or the image capturing device. The sensor data may be used to determine position and/or orientation of the image capturing device relative to the movable platform and/or a reference frame.

The carrier sensors 213 can provide position and/or orientation data that may be transmitted to one or more controllers (not shown) on the carrier or movable platform. The sensor data can be used in a feedback-based control scheme. The control scheme can be used to control the driving of one or more actuator members such as one or more motors. One or more controllers, which may be situated on a carrier or on a movable platform carrying the carrier, can generate control signals for driving the actuator members. In some instances, the control signals can be generated based on data received from carrier sensors indicative of the spatial disposition of the carrier or the payload 202 carried by the carrier 201. The carrier sensors may be situated on the carrier or the payload 202, as previously described herein. The control signals produced by the controllers can be received by the different actuator drivers. Based on the control signals, the different actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 201 can be coupled indirectly to the UAV via one or more damping elements. The damping elements can be configured to reduce or eliminate movement of the load (e.g., payload, carrier, or both) caused by the movement of the movable platform (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable platform that are transmitted to the load. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements may provide damping primarily along the Y (yaw) axis. As such, the illustrated damping elements can be configured to reduce vertical motions.

Although various embodiments may be depicted as utilizing a single type of damping elements (e.g., rubber balls), it shall be understood that any suitable combination of types of damping elements can be used. For example, the carrier may be coupled to the movable platform using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable platforms. In some instances, the load can be embedded within or enclosed by one or more damping elements.

Figure 3:
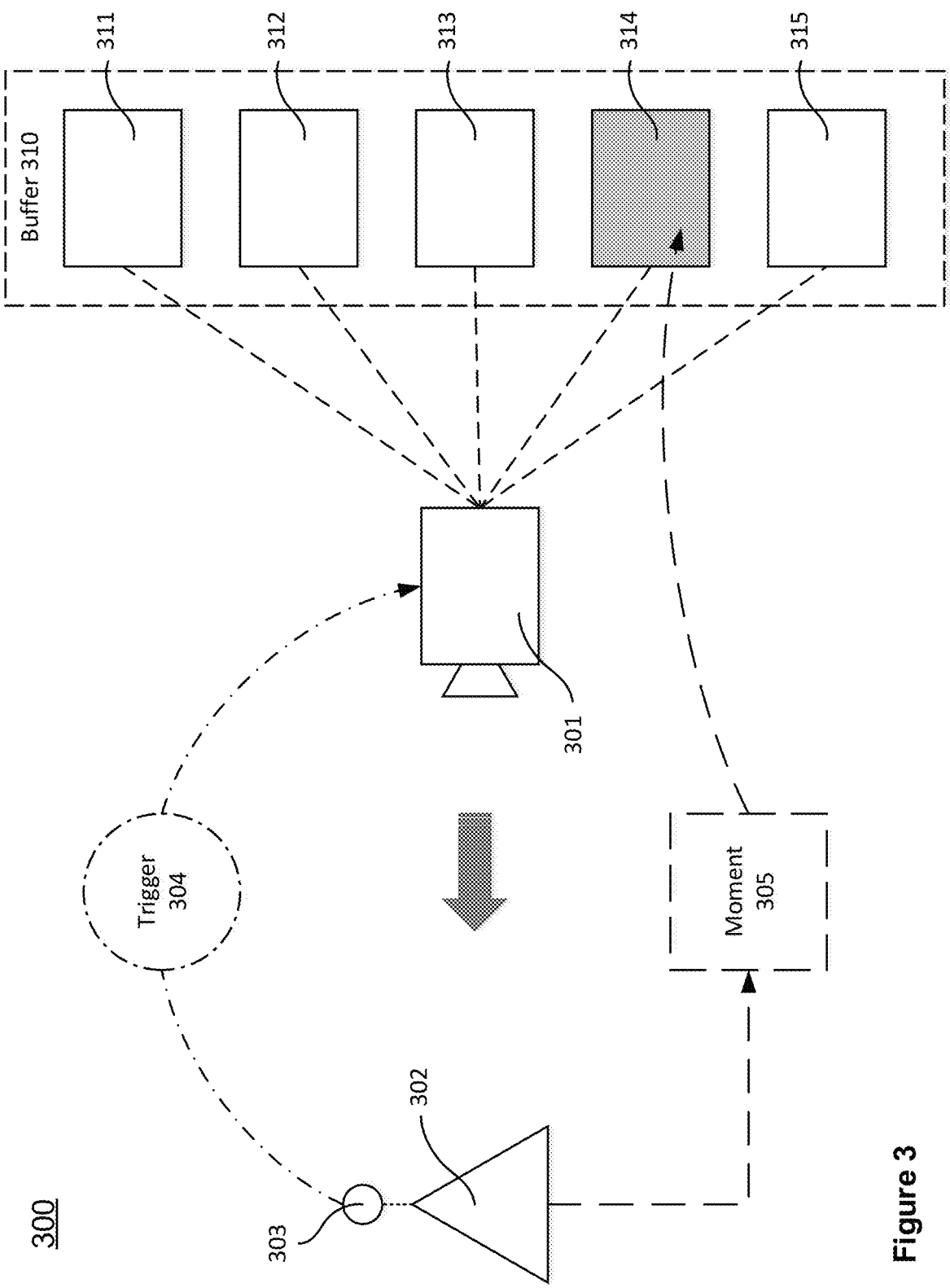
FIG. 3 illustrates moment capturing in an imagery environment, in accordance with various embodiments of the present disclosure.

FIG. 3 illustrates moment capturing in an imagery environment, in accordance with various embodiments of the present disclosure. As shown in FIG. 3, an imaging device 301 (e.g., a camera) in an imagery environment 300 can be used for capturing a moment 305 associated with an object 302. For example, the imagery environment 300 can include an unmanned aerial vehicle (UAV) that carries an imaging device, such as a camera, for capturing images of the object 302. Alternatively, the imaging device 301 in the imagery environment 300 can be any other types of imaging devices, such as the imaging devices that are installed at a fixed location or attached to a portable handler or carrier.

In accordance with various embodiments, a moment 305 can be relate to the motion and/or any state change of an object 302. In one example, a photographer may desire to capture a moment when a person is at the highest point of a jump or when the person's body is fully extended in a dive right before breaking into the water. In another example, a photographer may desire to capture a moment when a firework is fully displayed or when a racing car is passing another car at the last turn in a race. In yet another example, a photographer may desire to capture a moment when a bay is smiling or when a flower is blossoming. There are many different types of moments, some of which may even exist and can be appreciated beyond the description of words.

In accordance with various embodiments, the imagery system can support convenient moment capturing in an imagery environment 300. As shown in FIG. 3, the imaging device 301 can capture a plurality of images 311-315 after receiving a trigger 304.

In accordance with various embodiments, the trigger 304 can be based on one or more signals or indicators generated by the object 302. Alternatively, the trigger can be based on one or more signals or indicators generated by a user or any object in the surrounding environment. Thus, the start of the imagery process can be straightforward and convenient. For example, a single person can operate the imagery system without additional helps.

In accordance with various embodiments, the trigger 304 can be image based. For example, the object 302 in an image captured by the imaging device 301 can be a person. The person can interact with the imaging device 301 using indicators such as gestures, which are useful for conveying various messages such as starting to capture images. The gestures, which are visible body actions, can include various body movement by a person, such as the movement of hands, face, or other parts of the human body. Additionally, a gesture control mechanism can be used for detecting the trigger 304, such as recognizing and comprehending the different styles of gestures. In some embodiments, the gesture control mechanism can be based on various artificial intelligence and machine learning techniques, e.g. a convolutional neural network (CNN).

In accordance with various embodiments, the trigger 304 can be device based. For example, a device 303 attached to the object 302 can send a signal to the imaging device 302 for triggering the start of the image capturing process. The signal can include location information of the object 302, e.g. the related global navigation satellite system (GNSS) data, and instructions to the imaging device 301.

In accordance with various embodiments, the imagery system can support moment capturing by taking advantage of an image buffer. As shown in FIG. 3, the captured images 311-315 can be maintained in a buffer 310 (e.g. stored in a memory). In some embodiments, the buffering of the captured images 311-315 can be configured in different modes, e.g. based on various rules. For example, the buffering can be set at a predetermined frequency or can be dynamically configured based on a predetermined rule. Also, the length of the time period for buffering can be predetermined, configurable and/or dynamically determined. Thus, a user can conveniently adjust the buffering of the captured images in the imagery environment 300.

In accordance with various embodiments, the imagery system can automatically select, from the buffered images, an image 314 (or a subset of images) of the object 302 corresponding to the moment 305. The selection can be configurable, such as based on various selection rules. For example, the selection rules can be prescribed based on motion/sate estimation of the object 302. Alternatively, the selection can be a random process that is controlled or performed by a user. For example, the image(s) can be selected at a time point (or in a time period) that is pertinent to the particular moment 305.

Figure 4:
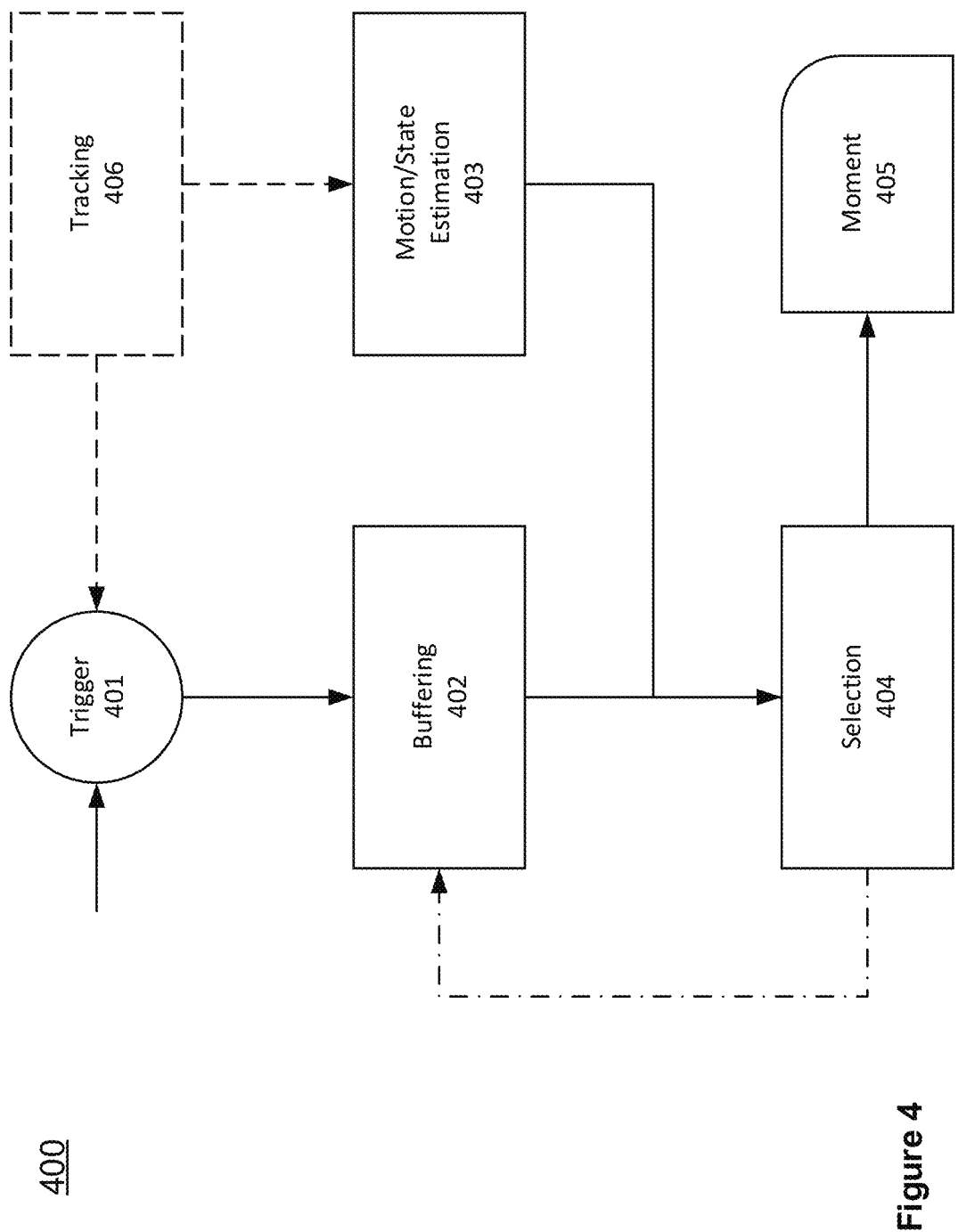
FIG. 4 illustrates an exemplary imagery system for moment capturing in accordance with various embodiments of the present disclosure.

FIG. 4 illustrates an exemplary imagery system for moment capturing in accordance with various embodiments of the present disclosure. As shown in FIG. 4, an imagery system 400 can start to capture images upon detecting a trigger 401, e.g. by detecting a triggering event or receiving a triggering signal from the object. The captured images can be maintained, e.g. stored using a buffering process 402. Furthermore, the imagery system 400 can perform motion/state estimation 403 to obtain motion information and/or state information of the object. Then, such information can be used by a selection process 404 for selecting one or more images related to a moment 405 from the buffered images 402 (for capturing the moment 405).

In accordance with various embodiments, the imagery system 400 can support moment capturing based on object tracking 406. The object tracking can be image based or device based. For example, the object being tracked (e.g. a person) can wear a device, such as a location sensor such as a global positioning satellite (GPS) receiver, which can provide a location signal to the tracking device (e.g. a UAV). In other examples, the device may be embedded in or otherwise attached to the object being tracked. Alternatively, the tracking can be performed based on computer vision technologies. For example, a bounding box, which is used for identifying the object being tracked, can move along with the object in the captured images consistently as the object moves. Thus, the imagery system 400 can be aware of the location and movement information of the object being tracked, either based on the received location signal or captured images.

In accordance with various embodiments, the imagery system 400 can perform motion and/or state estimation 403 based on the obtained location and movement information of the object. For example, based on the object tracking, the imagery system 400 can obtain the speed, acceleration, and spatial coordinates of the object, by evaluating the movement of the bounding box surrounding the object being tracked. Also, the imagery system 400 can obtain state information including temperature, color, shape of the object based on the location information of the object. Then, based on the motion and/or state information of the object, the imagery system 400 can automatically select one or more images pertinent to the moment 405, or allow a user to conveniently select images that are desirable for the moment 405.

Furthermore, the imagery system 400 can synchronize the estimated motion and/or state of the object with the plurality of images that are captured using the imaging device. For example, a UAV can track the object independently of the images that are captured by a main camera onboard. In such a case, the imagery system 400 can use a time stamp to ensure that the timing for tracking the object is synchronized with the timing for capturing images by the main camera.

In accordance with various embodiments, the selection process 404 can be used for selecting images that are pertinent to the moment 405 in order to reduce the number of images that are buffered. For example, the selection process can use a selecting rule for determining a time interval between the selected images. An exemplary selecting rule can define a fixed or variable frequency in selecting the images based on the estimated motion and/or state or the object. Then, the imagery system 400 can apply the determined time interval for updating the buffered images.

In accordance with various embodiments, the imagery system 400 can comprise a controller (not shown) that can generate instructions for controlling various components in the imagery system 400. For example, the controller can run on one or more microprocessors on an imaging device, a movable platform that carries the imaging device, a user terminal or any other computing device in the imagery system (such as a smart phone).

In accordance with various embodiments, the imagery system 400 can use multiple devices, such as multiple UAVs, for tracking an object (e.g. a person) in order for capturing a moment of the object from different angles simultaneously. For example, the imagery system 400 can start the buffering process 402, after detecting a trigger 401 when any of the tracking devices receives a signal or detects an indicator (e.g. from the object being tracked, etc.). Then, based on the images captured or signals received (by any or all of the devices), the imagery system 400 can perform motion/state estimation 403 for the object being tracked. Furthermore, based on the obtained motion and/or state information, the imagery system 400 can select one or more images related to the moment 405 from the buffered images 402 (i.e. for capturing the moment 405).

In some embodiments, the imagery system 400 can employ a timing control mechanism for synchronizing the image capturing processes among the multiple devices. For example, the imagery system 400 can apply a time stamp to the images captured by the different devices. Alternatively, the imagery system 400 can send a signal to the multiple devices for capturing images simultaneously. Thus, by taking advantage of the timing control system, the imagery system 400 can obtain (and then buffer) multiple sets of images that are pertinent to a particular moment 405, with each set of images of the object being tracked being captured from different angles at a substantially same time. Additionally, a user can select and edit the sets of images that are pertinent to the moment 405 for capturing the moment 405 from an ideal angle.

Figure 5:
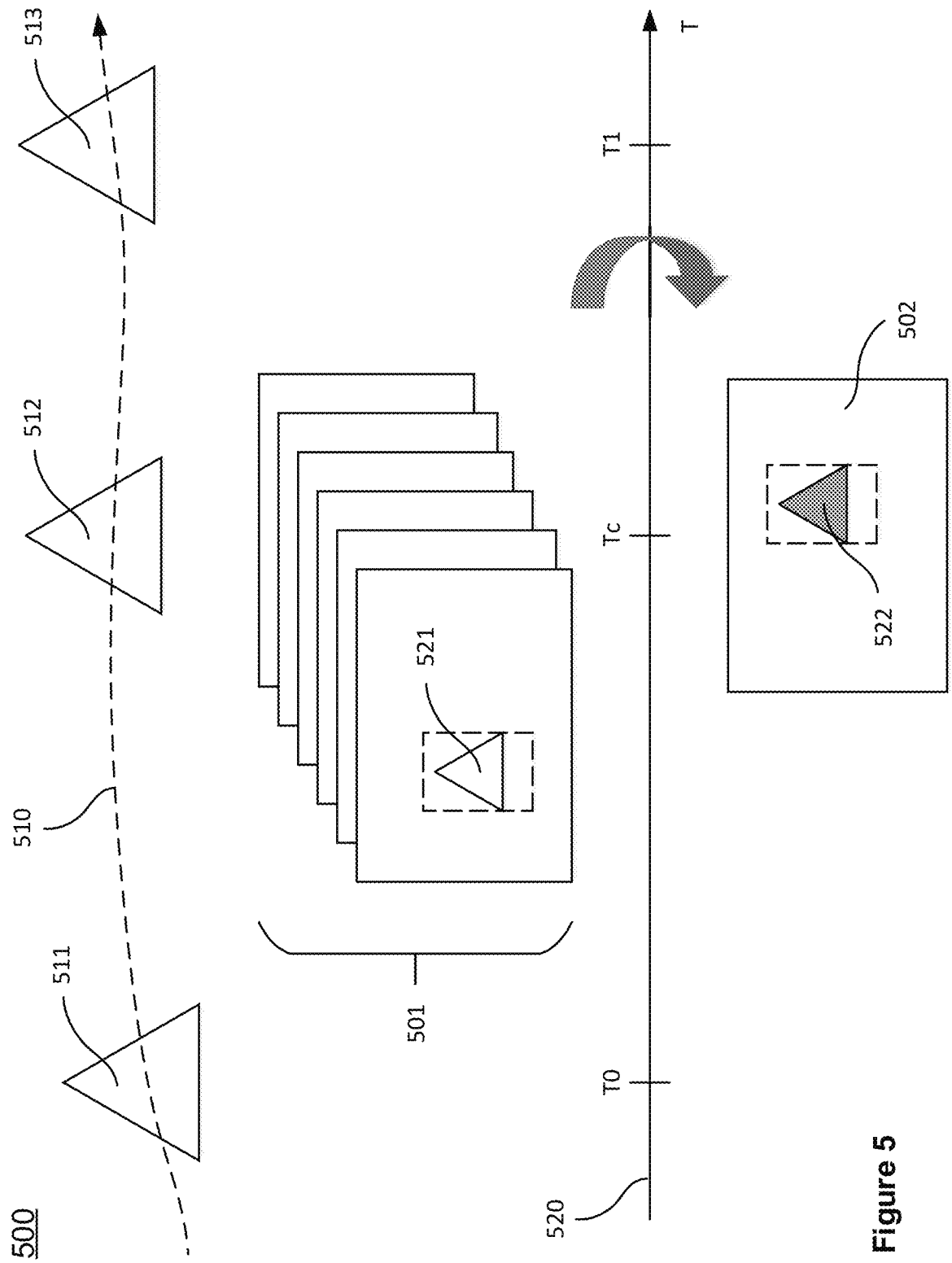
FIG. 5 shows an exemplary illustration of moment capturing based on motion tracking in an imagery environment, in accordance with various embodiments of the present disclosure.

FIG. 5 shows an exemplary illustration of moment capturing based on motion tracking in an imagery environment, in accordance with various embodiments of the present disclosure. As shown in FIG. 5, an imagery system 500 can capture a plurality of images as an object moves along a path 510 within a time period. For example, the object is at the position 511 at the time point T0, and the object is at the position 513 at the time point T1.

In accordance with various embodiments, the imagery system 500 can maintain the captured images 501 in an image buffer (not shown). Furthermore, the imagery system 500 can analyze the locations of the object in the buffered images 301 for performing motion estimation to obtain motion information of the object for the time period between T0 and T1. For example, the motion information may indicate the different motion modes of the object, e.g. whether a person is in a jump or a dive, or whether multiple objects are collide into each other or a single object is broken into pieces. Additionally, the motion information may contain information that characterizes the motion of the object, such as the location, speed, or acceleration of the object, and/or the rotation and orientation of the object.

In accordance with various embodiments, the imagery system 500 can perform motion estimation based on object tracking. For example, the imagery system 500 can estimate the motion of the object being tracked during the time period between T0 and T1 by evaluating the movement of a bounding box that is used to identify the object in the buffered images 501. Then, based on the estimated motion information, the imagery system 500 can select one or more images, e.g. image 502, from the buffered images 501. As shown in FIG. 5, the image 502 contains a portion of the object 522, which corresponds to the object at the position 512 at the moment Tc. Additionally, the imagery system 500 allows the user to pick a desirable image, which may not be exactly at the moment Tc.

Alternatively, the tracking of the object can be based on image frames captured by image sensors that are arranged differently from the imaging device that are used for capturing the buffered images. For example, in addition to a main camera, a UAV may be equipped with a set of imaging devices, which are arranged at different locations onboard the UAV, e.g. for the purpose of obstacle avoidance and object tracking. Thus, the motion estimation of the object being tracked can be performed based on a perspective transformation that compensates for the difference of orientation and field of view (FOV) between the imaging devices and the main camera.

Figure 6:
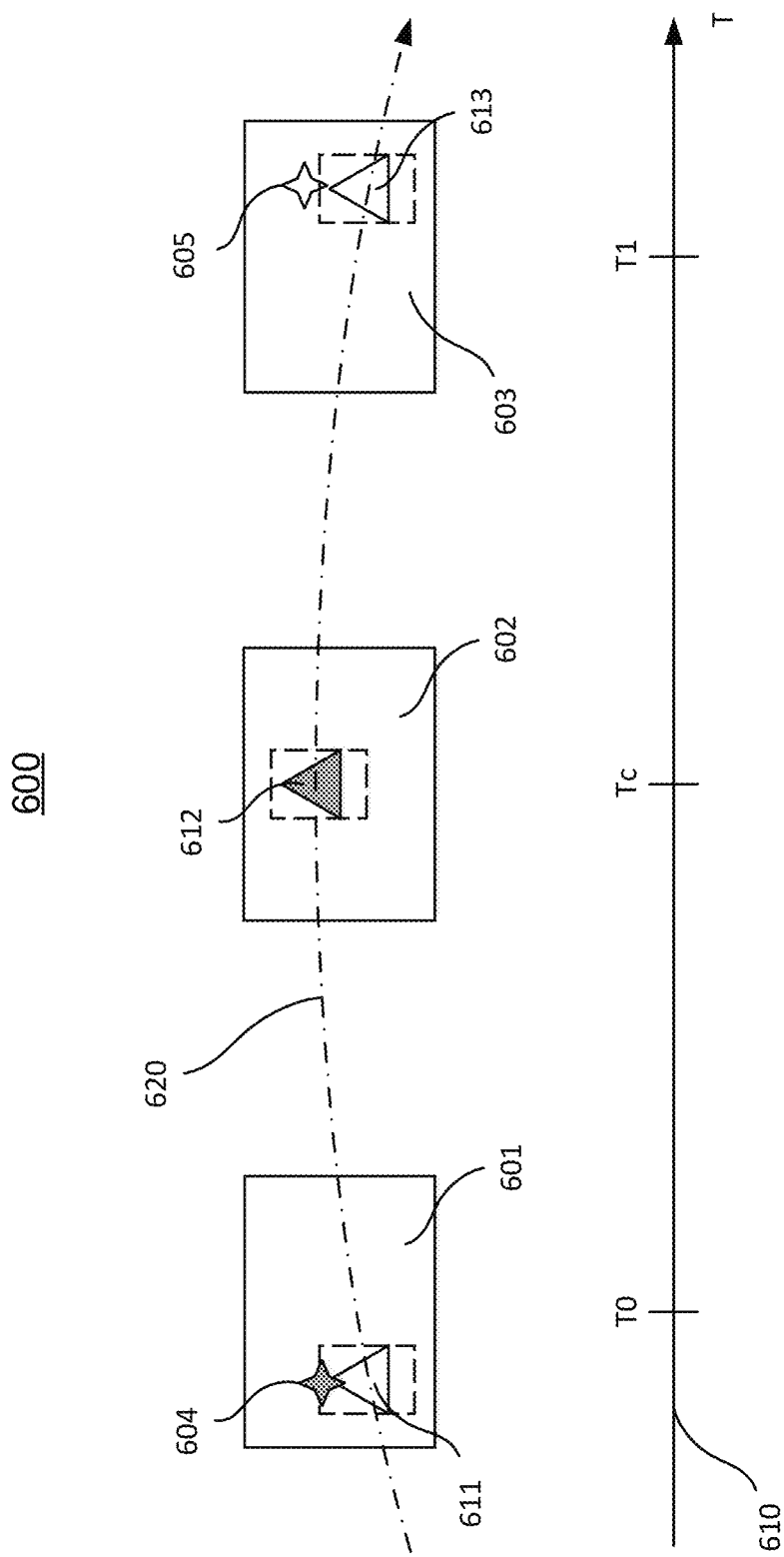
FIG. 6 illustrates capturing a moment of an object based on tracking the motion of the object in an imagery environment, in accordance with various embodiments of the present disclosure.

FIG. 6 illustrates capturing a moment of an object based on tracking the motion of the object in an imagery environment, in accordance with various embodiments of the present disclosure. As shown in FIG. 6, an imagery system 600 can capture a moment (e.g. Tc) based on object tracking.

In accordance with various embodiments, the imagery system 600 can capture a moment associated with an object based on image buffering while tracking the object. As shown in FIG. 6, the imagery system 600 can buffer a plurality of images of the object while the object is moving along a motion path 620 for a time period (e.g. between the time points T0 and T1 along a timeline 610). At the time point T0, an image can be captured for the object locating at the position 611. A trigger 603, e.g. a gesture detected in the image 601, can trigger the start of the image buffering and moment capturing process. At the time point T01, an image can be captured for the object locating at the position 613. The imagery system 600 can stop the image buffering and moment capturing process after detecting an indicator 605 (e.g. based on the motion/state estimation) or after receiving a signal or a predetermined time period as the user prescribes.

For instances, the imagery system 600 can capture a person in a jump motion. As soon as the imagery system detects the person in an initial position for jumping, the imaging device can start capture images that track the person in the air until the person lands back on the ground. While the person is in the air (i.e. in real time) or after the person actually lands (i.e. for post-processing), the imagery system can analyze the motion of the person, e.g. by obtaining a vertical distance of the person from the ground, the vertical and horizontal speed of the person, and the extension or the degree of inclination of the body in each captured image.

Then, based on the obtained motion information of the person, the imagery system 600 can output an image 602, or allow a user to pick an image 602, for the moment Tc from the buffered images. In the example as shown in FIG. 6, the person may be located at the top of a trajectory path line 620 at the moment Tc. Alternatively, the image 602 can be select for the moment when the body of the person is fully extended or with the largest degree of inclination. Additionally, the imagery system 600 allows the user to pick a desirable image, which may not be exactly at the moment Tc.

Figure 7:
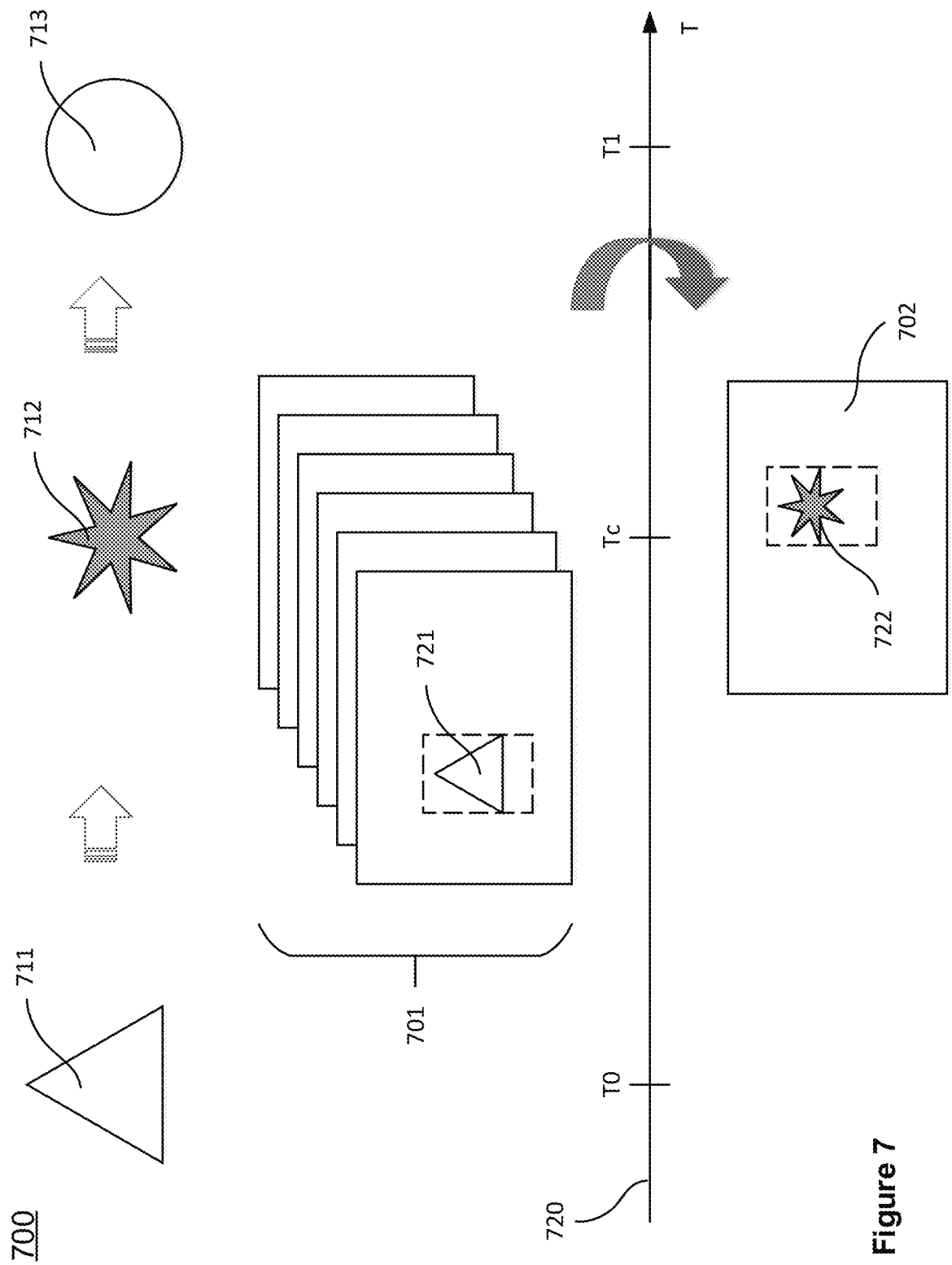
FIG. 7 shows an exemplary illustration of moment capturing based on state estimation in an imagery environment, in accordance with various embodiments of the present disclosure.

FIG. 7 shows an exemplary illustration of moment capturing based on state estimation in an imagery environment, in accordance with various embodiments of the present disclosure. As shown in FIG. 7, an imagery system 700 can capture a plurality of images as a state of an object changes during a time period, e.g. between the time points T0 and T1 along the timeline 720.

In accordance with various embodiments, the imagery system 700 can maintain the captured images 701 in an image buffer (not shown). Furthermore, the imagery system 700 can analyze the state change of the object among the buffered images 701 for capturing a moment that is associated with the state change of the object.

As shown in FIG. 7, along the timeline 720, the object is in the state 711 at the time point T0 and the object is in the state 713 at the time point T1. At the time point Tc, the object is in a special state 712, which is a moment desirable for capturing. By taking advantage of a state estimation process, the imagery system 700 can obtain various state information associated with the object, such as the color, shape or temperature of the object. Then, the imagery system 700 can select one or more images, e.g. an image 702, from the buffered images 701. As shown in FIG. 7, the image 702 contains a portion of the object 722, which corresponds to the object in the state 712 at the moment Tc.

In accordance with various embodiments, the imagery system 600 can perform the state estimation based on the motion estimation. For example, based on object tracking, the imagery system 600 can be aware of the location of the object, as well as other movement characteristics of the object, such as speed, acceleration, rotation and orientation of the object being tracked. On the other hand, the tracking of the object can take into account of the state change associated with the object being tracked. For example, the imagery system 600 can ensure that the object is being tracked even when the object changes color or shape.

Figure 8:
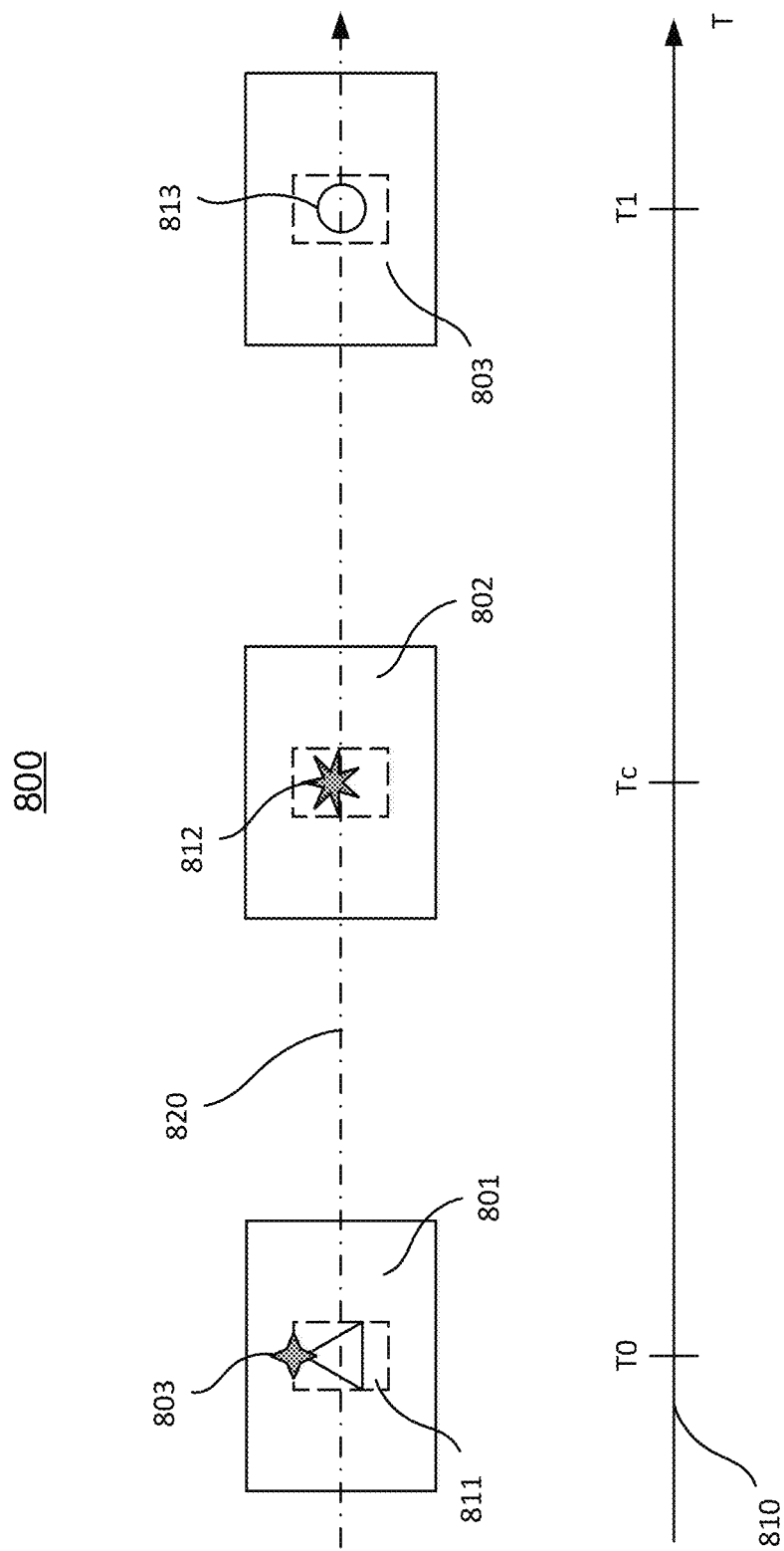
FIG. 8 illustrates capturing a moment based on tracking an object with changing state in an imagery environment, in accordance with various embodiments of the present disclosure.

FIG. 8 illustrates capturing a moment based on tracking an object with changing state in an imagery environment, in accordance with various embodiments of the present disclosure. As shown in FIG. 8, an imagery system 800 can capture a moment (e.g. Tc) for an object based on tracking the object as its state changes.

In accordance with various embodiments, the imagery system 800 can support the moment capturing based on image buffering while tracking an object with changing state. As shown in FIG. 8, the imagery system 800 can buffer a plurality of images of the object, which is in a state transition 820 during a time period (e.g. the time period between the time point T0 and the time point T1 along the timeline 810). For example, at the time point T0, an image can be captured for the object, which is in the state 811. A trigger 803, e.g. a signal or a predetermined state, can be detected in the image 801, e.g. when the person pose a specific gesture which triggers the start of the image buffering. Then, the imagery system can output an image 802, or let a user to pick the image 802 from the buffered images at a moment Tc.

For instance, the imagery system can capture an explosion of a firework at the moment Tc based on object tracking and buffering. The imagery system 800 can direct or cause the imaging device to start capturing images as soon as detecting a noise from the firing a shell. The imaging device can capture a series of images that track the shell and sparkles before and after the explosion. While the firework is in the air (i.e. in real time) or after the sparkles fade away (i.e. for post-processing), the imagery system 800 can analyze the state of the firework, e.g. evaluating the stage of the firework (e.g. before and after the explosion) in the buffered images. Also, the imagery system 800 can analyze the color, brightness, and pattern of the firework in each image. Additionally, the imagery system can analyze the motion information of the firework in the air, e.g. obtaining a distance of the firework from the ground, the vertical and horizontal speed of the firework, and the scale and the position relative to another firework. In some embodiments, such motion information of the firework can be used by the imagery system 800 for analyzing the state of the firework. For example, the motion information for different shells can be beneficial in determining the right moment for capturing a picture with multiple fireworks displaying simultaneously.

Then, based on the obtained motion information of the person, the imagery system 800 can output an image 802, or allow a user to pick an image 802, for the moment Tc from the buffered images. In the example as shown in FIG. 8, the firework may be fully exploded (e.g. displaying a smile face) at the moment Tc. Alternatively, the image 802 can be select for the moment when multiple fireworks are displayed simultaneously. Additionally, the imagery system 800 allows the user to pick a desirable image, which may not be exactly at the moment Tc.

Figure 9:
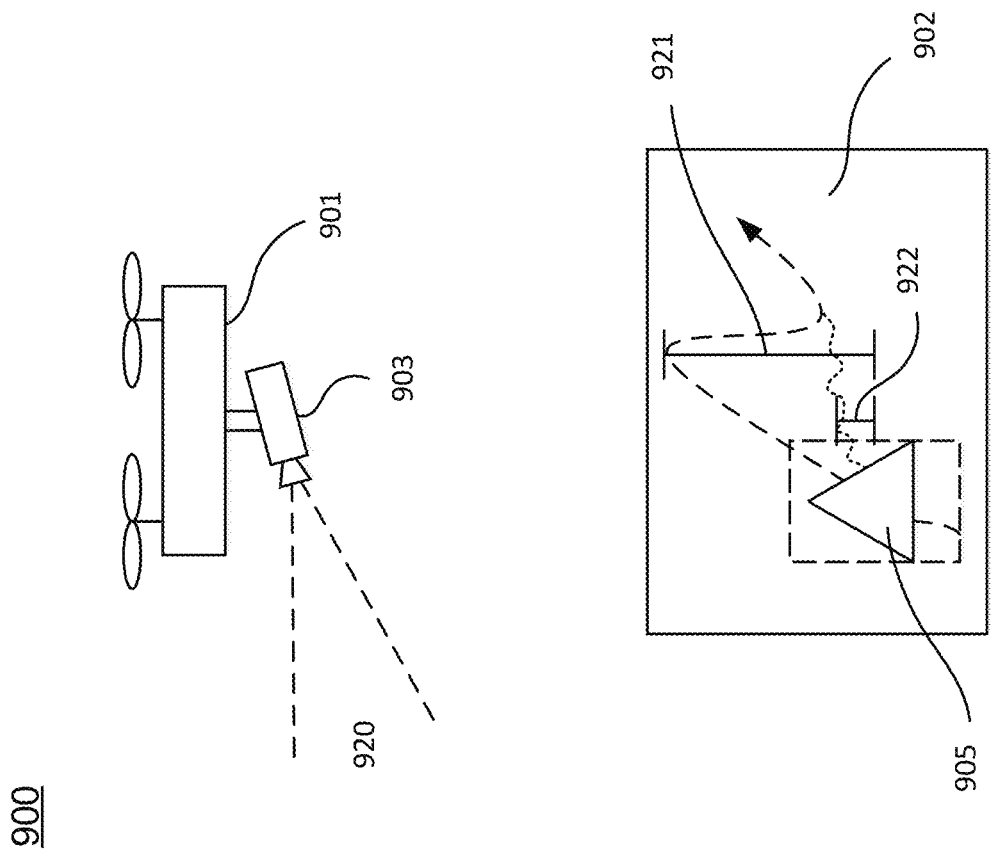
FIG. 9 illustrates moment capturing based on object tracking using an unmanned aerial vehicle (UAV), in accordance with various embodiments of the present disclosure.
Figure 9:
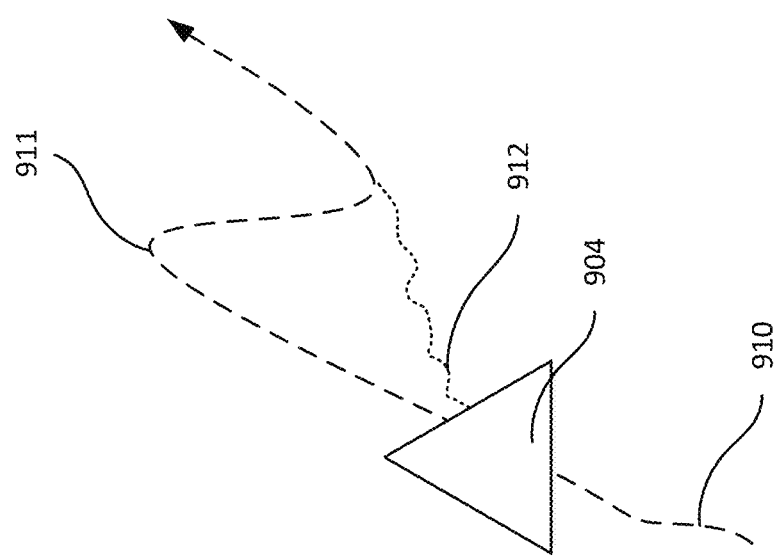

FIG. 9 illustrates moment capturing based on object tracking using an unmanned aerial vehicle (UAV), in accordance with various embodiments of the present disclosure. As shown in FIG. 9, a camera 903, which is carried by an UAV 901, can capture an image 902 while tracking the movement of an object (e.g. a person 904) in an imagery environment 900.

For example, the UAV 901 can track the person 904, such as the user herself, while she is moving either in a jump motion along the path line 911 or jogging along a path line 912 in the three-dimensional (3D) space. The UAV 901 can track and monitor the movement of the person 904 by analyzing the images captured using the camera 903 with a field of view (FOV) 920. One exemplary method for determining the movement characteristics of the user can be performed by taking advantage of various computer vision technologies, such as an optical flow algorithm, and other useful techniques, such as various gait recognition methods.

In accordance with various embodiments, an imagery system can comprise a controller (not shown) that can generate instructions for controlling various components in the imagery system. For example, the controller can run on one or more microprocessors on an imaging device 903, a movable platform 901 that carries the imaging device, a user terminal or any other computing device in the imagery system (such as a smart phone).

As shown in FIG. 9, the imagery system can obtain necessary dimensional information, e.g. the height information of the person, based on a bounding box that is used for identifying and tracking the person 904. Furthermore, the imagery system can perform more specialized motion estimation based on the obtained dimensional information. For example, the imagery system for the UAV 901 can perform jump detection, in order to distinguish between a jump motion by the person 904 and the normal up and down motion of the human body, e.g. while the person 904 is jogging. To perform jump detection, the UAV 901 can determine that the person is in a jump motion when the bounding box for tracking the person moves upward for a substantial distance (e.g. for the distance 921, which is beyond a threshold distance). On the other hand, the UAVs 901 can recognize the normal up and down motion of the human body 922, e.g. for the distance 922, which is below the threshold distance, when the person is jogging.

In accordance with various embodiments, the imagery system can select and maintain (e.g. store) the buffered images for the time period from the beginning of a jump to the landing the person. In some embodiments, the selection can be based on various predetermined rules. For example, the images can be selected based on a predetermined time interval, or a predetermined vertical distance interval. Alternatively, a cluster of images can be selected when the person is close or at the top point. Thus, the imagery system can automatically select an image that is pertinent to a particular moment.

In some embodiments, the image 902 can be transmitted to a user terminal that is remote from the UAV 901. Thus, the imagery system may allow a user to select an image from a set of images that are buffered.

Figure 10:
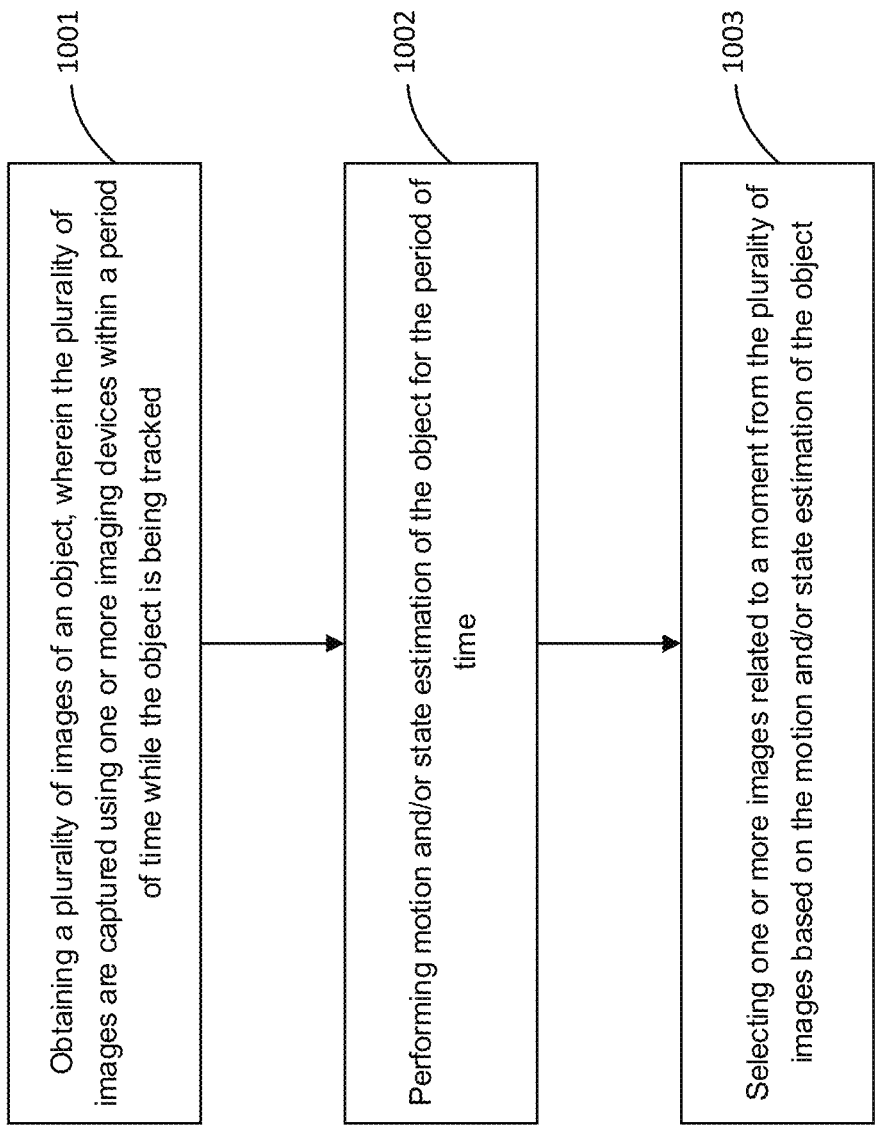
FIG. 10 shows a flowchart of moment capturing in an imagery environment, in accordance with various embodiments of the present disclosure.

FIG. 10 shows a flowchart of moment capturing in an imagery environment, in accordance with various embodiments of the present disclosure. As shown in FIG. 10, at step 1001, the system can obtain a plurality of images of an object, wherein the plurality of images are captured using one or more imaging devices within a period of time while the object is being tracked. Furthermore, at step 1002, the system can perform motion and/or state estimation of the object for the period of time. Then, at step 803, the system can select one or more images from the plurality of images based on the motion and/or state estimation of the object.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. An imagery method, comprising:
   obtaining a plurality of first images of an object, wherein the plurality of images are captured using a main imaging device configured at a first location on a movable platform within a period of time while the object is being tracked;
   obtaining one or more second images of the object within the period of time from one or more image sensors configured at one or more second locations on the movable platform, the one or more second locations being different from the first location, and the one or more second images being synchronized with the plurality of first images;
   performing motion or state estimation of the object for the period of time by analyzing the one or more second images according to a perspective transformation that compensates for field-of-view differences between the main imaging device and the one or more image sensors; and
   selecting one or more images related to a moment from the plurality of first images based on the motion or state estimation of the object.

2. The method of claim 1, further comprising:
   maintaining the plurality of first images in an image buffer.

3. The method of claim 2, further comprising:
   causing the main imaging device to capture the plurality of first images upon receiving a trigger.

4. The method of claim 3, wherein the trigger is an indicator that is detected from a previously-captured image of the object or a signal received from the object.

5. The method of claim 2, wherein the plurality of first images are buffered at a frequency that is predetermined or dynamically configured based on a rule.

6. The method according to claim 1, further comprising:
   obtaining a plurality of sets of the first images of the object from a plurality of angles simultaneously for the period of time, each set of the first images being obtained by one of a plurality of main imaging devices configured on one of a plurality of movable platforms;
   for each of the plurality of sets of the first images, selecting one or more images related to the moment based on the motion or the state estimation of the object; and
   select among the one or more selected images from an angle according to a user input.

7. The method of claim 1, wherein the motion information of the object is obtained by analyzing a movement of a bounding box that is used to identify the object in the one or more images that are used to track the object.

8. The method of claim 1, wherein the movable platform is an unmanned aerial vehicle (UAV).

9. The method of claim 1, further comprising:
   receiving one or more location signals from the object; and
   determining motion information of the object based on the one or more location signals received from the object.

10. The method of claim 1, further comprising:
    determining a time interval based on a selecting rule;
    wherein the one or more images are selected further based on the time interval.

11. The method of claim 10, further comprising:
    storing the selected images in an image buffer.

12. The method of claim 10, further comprising:
    identifying an image from the selected images based on a user input.

13. An unmanned aerial vehicle (UAV), comprising:
    a memory that stores one or more computer-executable instructions; and
    one or more processors configured to access the memory and execute the computer-executable instructions to perform a method comprising:
      directing the UAV to track an object;
      obtaining a plurality of first images of the object, wherein the plurality of images are captured by a main imaging device configured at a first location on the UAV within a period of time while the object is being tracked;
      obtaining one or more second images of the object within the period of time from one or more image sensors configured at one or more second locations on the UAV, the one or more second locations being different from the first location, and the one or more second images being synchronized with the plurality of first images;
      performing motion or state estimation of the object for the period of time by analyzing the one or more second images according to a perspective transformation that compensates for field-of-view differences between the main imaging device and the one or more image sensors; and
      selecting one or more images related to a moment from the plurality of images based on the motion or state estimation of the object.

14. An imagery system, comprising:
    one or more microprocessors;
    a controller running on the one or more microprocessors, wherein the controller operates to obtain a plurality of first images of an object, wherein the plurality of images are captured using a main imaging device configured at a first location on a movable platform within a period of time while the object is being tracked;

obtain one or more second images of the object within the period of time from one or more image sensors configured at one or more second locations on the movable platform, the one or more second locations being different from the first location, and the one or more second images being synchronized with the plurality of first images;

perform motion or state estimation of the object for the period of time by analyzing the one or more second images according to a perspective transformation that compensates for field-of-view differences between the main imaging device and the one or more image sensors; and select one or more images related to a moment from the plurality of first images based on the motion or state estimation of the object.

15. The imagery system of claim 14, wherein the controller operates to maintain the plurality of first images in an image buffer.

16. The imagery system of claim 15, wherein the controller operates to cause the main imaging device to capture the plurality of first images upon receiving a trigger.

17. The imagery system of claim 16, wherein the plurality of first images are buffered at a frequency that is predetermined or dynamically configured based on a rule.

18. The imagery system of claim 16, wherein the trigger is an indicator that is detected from a previously-captured image of the object or a signal received from the object.

* * * * *